June 18, 1929.  G. LINTON  1,717,515
MOTOR VEHICLE TOP
Filed June 14, 1924
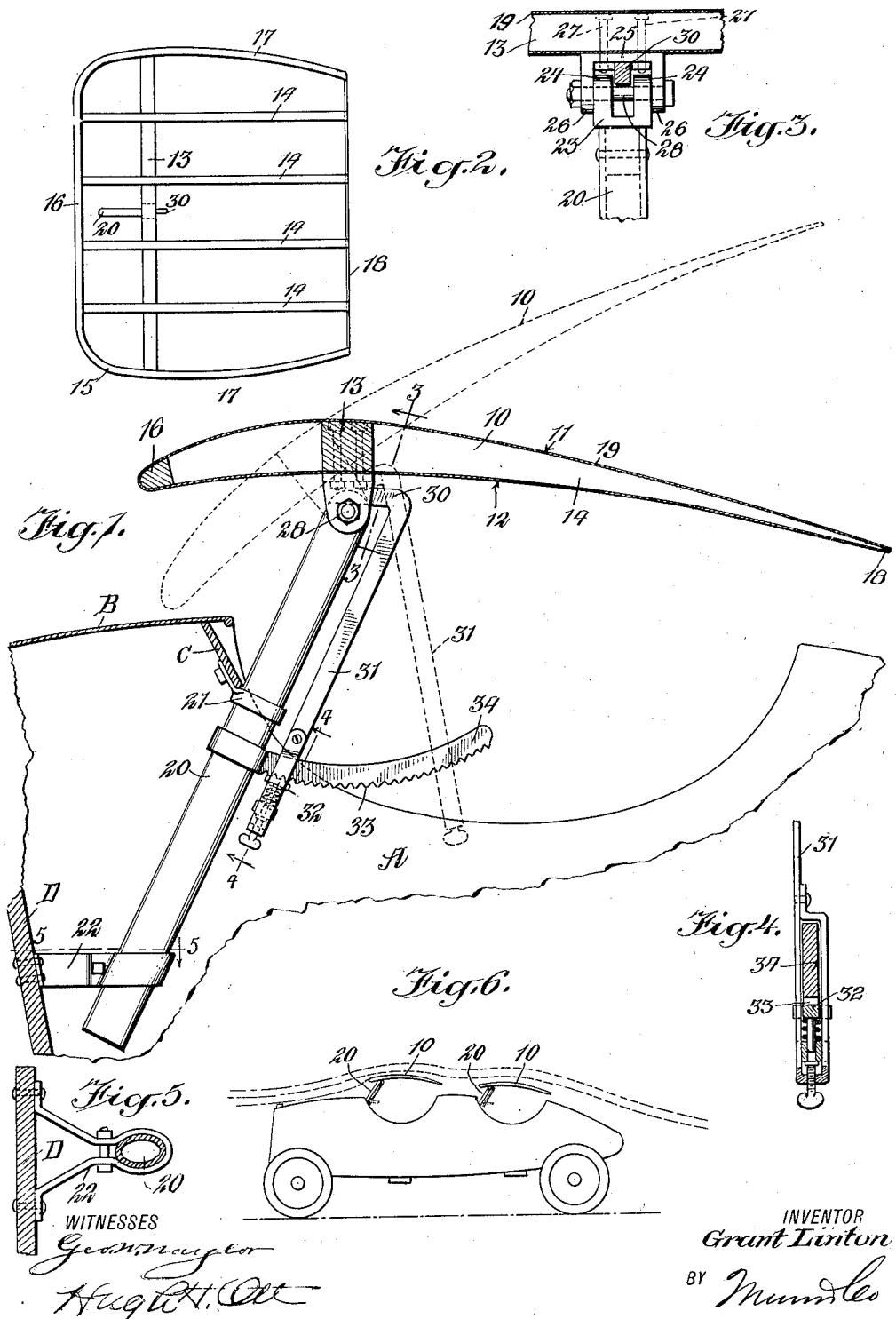

Patented June 18, 1929.

1,717,515

UNITED STATES PATENT OFFICE.

GRANT LINTON, OF NEW YORK, N. Y.

MOTOR-VEHICLE TOP.

Application filed June 14, 1924. Serial No. 720,016.

This invention has relation to motor vehicle tops and refers more particularly to a top for motor cars of the sport model type.

Among the outstanding objects of the present invention, is the provision of a motor vehicle top of conventional aerofoil type, illustrated in the accompanying drawings, which acts substantially as a wind shield owing to the well known tendency of this type of surface, even at a slight inclination, to deflect a portion of the air over the upper surface, whereby the driver and other occupants of the vehicle are given an unobstructed view.

By "aerofoil", as hereinafter used, is meant a conventional wing-like structure designed to obtain reaction upon its surfaces from the air through which it moves, and which has the further related property of decreasing the velocity of the air flow at the under side and increasing it at the upper side with a minimum disturbance of and resistance to the air. By "aerofoil section", as hereinafter used, is meant a section of the aerofoil made by a plane parallel to the plane of symmetry of the aerofoil.

The invention furthermore contemplates a motor vehicle top which operates to effect a minimum disturbance to the air, by converting an otherwise turbulent flow about the cock pit to a stream line flow, whereby a substantial reduction in the overall head resistance of the vehicle is obtained.

As a further object the invention comprehends an improvement in motor vehicle tops, which affords protection to the occupants of a vehicle from the sun, air, or other elements, and this without in any way detracting from the speed line appearance of the vehicle, but rather enhancing the same.

As a still further object the invention comprehends a means for mounting the top which renders it capable of ready attachment to or detachment from the vehicle, and which further constitutes a means for moving the top to facilitate the entrance or exit of the occupants.

The invention furthermore comprehends a vehicle top for motor cars which is comparatively simple in its construction, inexpensive to manufacture and install, and which is highly efficient in its purpose.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawings—

Figure 1 is a fragmentary longitudinal sectional view through an automobile equipped with a top constructed in accordance with the invention.

Fig. 2 is a plan view on a reduced scale of the frame of the top with the covering removed.

Fig. 3 is a detail enlarged sectional view taken approximately on the line indicated at 3—3 in Fig. 1.

Fig. 4 is an enlarged detail sectional view taken approximately on the line indicated at 4—4, Fig. 1.

Fig. 5 is a detail horizontal sectional view taken approximately on the line indicated at 5—5 in Fig. 1.

Fig. 6 is a conventional side view illustrating an automobile having front and rear seats equipped with tops constructed in accordance with the invention.

Referring to the drawings by characters of reference, A designates the cock pit of an automobile, B the cowl, C the cowl dash, and D the dash. The top constituting the invention is of conventional aerofoil type, and as such is designated at 10 as presenting an upper surface 11 having a convex-parabolic form at the outer side with the vertex of the parabola near the leading edge, and a generally concave lower surface 12 contiguous at its edges with the edges of the upper surface 11. In regard to the lower surface of the top, it is well known that the particular shape of the lower surface of an aerofoil is relatively unimportant, and that it is the upper substantially parabolic surface which is essential to efficient action. In conformance with this fact, the lower surface of the top may, for structural reasons, be made flat or even slightly convex. The trailing edge of the top also may be bent slightly upward, as in some standard aerofoils. The degree of curvature, the taper, grading, plan form, etc., are made to conform generally to the lines of the car to which the top is applied. In the present instance the top 10 will preferably consist of a framework comprising a cross beam 13 of any suitable material having webbed and capped parallel longitudinal ribs 14 and a substantially U-shaped marginal reinforcing member 15, the bight 16 of which constitutes the forward edge and the legs 17 of which define the side edges. The rear free ends of the legs 17 and the ribs 14 will be connected by a connecting element 18 such as piano wire, while the forward ends of the ribs 14 will be suitably connected with the bight 16. The frame will then preferably be covered by a doped fabric 19 which provides the upper and lower surfaces 11 and 12 of the top structure. The means for supporting or mounting the top on the vehicle preferably includes a single rearwardly inclined stream lined strut 20 secured by upper and lower brackets 21 and 22 respectively to the cowl dash C and the true dash D. The upper end of the strut is bifurcated or provided with a forked bearing element 23 presenting aligned apertured furcations or bearing ears 24. An attaching element 25 of substantially inverted U-shaped formation having spaced knuckles 26 formed with aligned apertures is secured to the under side of the top 10 by means of bolts 27 which extend through the bearing element and the crossbeam 13. A transverse pivot bolt 28 is inserted through the knuckles 26 and bearing ears of furcations 24 whereby the top is connected with the strut 20 for pivotal movement and further to permit of quick detachment of the top from the strut when it is desired to remove the same. In order to provide means for swinging the top on its pivot 28 to adjust the angle of incidence or facilitate the entrance or exit of the occupants of the vehicle, the attaching element 25 is preferably formed with an integral rearwardly projecting arm 30, the major portion of the free end of which is bent downwardly as at 31 to provide a manipulating handle or lever to be grasped by the operator for swinging the top 10 on its pivot. In order to provide means to maintain the top in variously adjusted positions, the free end of the handle 31 is provided with a suitable spring-pressed detent 32 engageable with the teeth 33 of a quadrant 34 which is attached to the strut 20.

In use the configuration of the freely suspended vehicle top 10 serves to react effectively on the air upon forward movement of the vehicle, whereby a portion of the air will be deflected over the upper parabolic surface 11. It will therefore be obvious that the use of a glass or other transparent panel to act as a windshield will be obviated except as an optional or auxiliary device for stormy weather as the top of itself will give substantially a windshield effect. This effect, it should be noted, will not be merely in the simple ratio of the reduced air speed to the true relative speed, but will be in the square of this ratio, in accordance with the well-known fact that the dynamic pressure effects of air between the speeds of 10 and 100 miles per hour vary not directly as the speed but as the square of the speed. It will be furthermore observed that the configuration of the top and the supporting strut 20 will serve to minimize the disturbance of the air as a whole by converting the otherwise turbulent flow with a consequent reduction in the overall head resistance of the vehicle when in motion. The mounting of the top in the manner heretofore described further serves to permit of adjustment of the same to obtain the desired angle of incidence of the top whereby it will function to the best advantage and furthermore to facilitate the entrance and exit of the passengers or occupants of the vehicle.

In Fig. 6 there is diagrammatically illustrated the application of tops of the character set forth to the front and rear seats of a two-seated vehicle and in which the construction and operation is substantially the same as that hereinbefore described.

I claim:

1. In a motor vehicle, an aerofoil shaped top, a strut adapted to have its lower end secured to the vehicle body, and means for pivotally connecting the upper end of the strut with the under side of the top at the longitudinal center and a considerable distance in front of the center of length thereof, and means for adjusting the top, said means comprising a lever secured to the top, and locking means for the lever.

2. In a motor vehicle, a strut having a bifurcated upper end and adapted to have the lower end secured to the vehicle body, an aerofoil shaped top, a member having spaced knuckles secured to the under side of the top, at the longitudinal center and in front of center of length thereof, a bolt passing through said bifurcations and knuckles, and means secured to said member for adjusting the top.

3. In a motor vehicle, a strut having a bifurcated upper end and adapted to have the lower end secured to the vehicle body, an aerofoil shaped top, a member having spaced knuckles secured to the under side of the top at the longitudinal center and in front of the center of length, a bolt passing through said bifurcations and knuckles, a lever having a bent upper end secured to said member, the lever extending downwardly in close proximity to the strut, a spring detent carried by the lever, and a toothed quadrant secured to the strut and with which the detent engages.

4. The combination with a sport motor car, of a rearwardly inclined strut having its lower end secured to the transverse center of the body of the car, an aerofoil shaped top, and means for pivoting the upper end of the strut to the under side of the top at the longitudinal center and at the side of the center of length of the top, and a manually operated lever for adjusting the inclination of the top.

GRANT LINTON.